United States Patent [19]

Christiansen

[11] Patent Number: 4,651,783

[45] Date of Patent: Mar. 24, 1987

[54] PIPE FOR USE IN SYSTEMS FOR HOT GASES

[75] Inventor: Hans A. Christiansen, Nylars, Denmark

[73] Assignee: Hasle Klinger- & Chamottestensfabrik A/S, Ronne, Denmark

[21] Appl. No.: 888,634

[22] PCT Filed: Apr. 12, 1984

[86] PCT No.: PCT/DK84/00029

§ 371 Date: Dec. 28, 1984

§ 102(e) Date: Dec. 28, 1984

[87] PCT Pub. No.: WO84/04471

PCT Pub. Date: Nov. 22, 1984

Related U.S. Application Data

[63] Continuation of Ser. No. 691,565, Dec. 28, 1984, abandoned.

[30] Foreign Application Priority Data

May 9, 1983 [DK] Denmark ............................ 2055/83

[51] Int. Cl.⁴ ............................................. F16L 11/16
[52] U.S. Cl. .................................... 138/107; 138/155; 55/267; 55/459 R
[58] Field of Search ................ 55/267, 411, 435, 448, 55/460, 459 R, 459 A, 459 B, 459 C, 459 D; 138/141, 155, 109, 120, 107; 165/9.1, 9.4, 78; 422/240, 241, 147

[56] References Cited

U.S. PATENT DOCUMENTS 2,884,780  5/1959  Ramirez ................................. 72/38
3,273,320  9/1966  DeLaune et al. .................. 55/459 R
3,667,196  6/1972  Koeneckle ......................... 55/411 X
4,259,993  4/1981  Scholz .............................. 138/155 X
4,314,677  2/1982  Soreen .............................. 138/155 X
4,326,561  4/1982  Kutnyak ........................... 138/109 X
4,342,574  8/1982  Fetzer ..................................... 55/341
4,505,051  3/1985  Horchenbach et al. ........... 55/267 X

FOREIGN PATENT DOCUMENTS 408952  7/1979  Sweden .
199998  12/1938  Switzerland .

Primary Examiner—Charles Hart
Attorney, Agent, or Firm—Kenyon & Kenyon

[57] ABSTRACT

In a cyclone for the cleaning of hot gases, the center-pipe (1) is produced of curved outer and inner elements (7, 8) which are made of fireproof material. The outer and inner elements (7, 8) are suspended in a self-supporting construction in upper end elements (2), and the lower edge of the center-pipe (1) is provided with lower end elements (14), in that the individual elements are suspended within each other by means of projections (9, 9), and the upper end elements (2) are suspended in a supporting structure (16) by means of anchoring devices (13) which cooperate with grooves in the upper end elements (2). There is hereby achieved a center-pipe (1) which is capable of withstanding high temperatures, and which can therefore be used in cyclones for the cleaning of hot gases. Since the center-pipe is built up of a large number of elements (7, 8, 2, 14), it can be expedient for it to be assembled during the building of the actual cyclone, and thus it becomes much easier and cheaper both to produce and to transport the individual elements.

6 Claims, 7 Drawing Figures

PIPE FOR USE IN SYSTEMS FOR HOT GASES

This application is a continuation of application Ser. No. 691,565, filed Dec. 28, 1984 and now abandoned.

BACKGROUND OF THE INVENTION

1. Field of the Invention

This invention relates to a pipe for use in systems which work with hot gases, i.e., for example, as the centre-pipe in a cyclone for the cleaning of hot gases or the reaction chamber in a fluid-bed installation.

2. Description of the Related Art

For the separation of particles from currents of air, the use is known, for example, of one or more cyclones. A cyclone consists of an upper, cylindrical part and a lower conical part. The air flow is introduced tangentially at the head of the cylindrical part, and continues in a downwardly-directed spiral movement. This is the so-called primary vortex, which continues down towards the nose of the conical part. From here, an upwardly-directed spiral movement emanates, namely the so-called secondary vortex. This leaves the cyclone through an axial outlet, the so-called centre-pipe, at the head of the cyclone.

For reasons of the vortical motion, the particles in the air current are influenced by strong centrifugal forces, whereby they are forced outwards towards the wall of the cyclone. From here they fall downwards towards the nose and are collected in a large container, said container either being changed at suitable intervals or continuously emptied through a sluice.

During the process of lime burning or in the manufacture of cement, it is desirable to clean the discharge air from the rotary kiln. A cyclone would be suitable for such cleaning, but commonly-known cyclones of metal have the disadvantage that the hot discharge gases will ruin the centre-pipe, in that said centre-pipe lies precisely in the path of the flow of hot gases and can be cooled only with great difficulty. The weldings in the centre-pipe will rupture, and the output from the cyclone gets blocked by falling material. Furthermore, the cyclone will, of course, be ruined. It has been shown that even metal alloys with high melting points have difficulty in withstanding the hot gases.

Moreover, to produce a centre-pipe of such alloy is very costly, in that a centre-pipe for a cyclone for the cleaning of discharge gases from a rotary kiln can, for example, have a diameter of 2–3 meters and a length of 1–2 meters.

Fluid-bed systems are installations in which the particle-formed material is held floating in an upwardly-directed flow of air. Such installations are used, for example, in the burning of lime and for other applications where it is desired to expose such materials to high temperatures, the reason being that when the material is held in a floating state, it has a very great effective surface.

With such systems, one meets the same problems as those encountered with centre-pipes for cyclones. The material must be held floating in a reaction chamber, and this must be capable of withstanding very high temperatures.

SUMMARY OF THE INVENTION

The object of the invention is to present a pipe which can tolerate even very much higher temperatures, and which can be used for the purposes discussed.

According to the present invention, there is provided a substantially vertical pipe for conveying hot gases, the pipe being suspended from its upper end and being assembled from superposed, circumferentially extending, radially inner rows of ceramic fireproof elements, and from superposed, circumferentially extending, radially outer rows of ceramic fireproof elements; the radially outer rows being vertically offset relative to the radially inner rows; the radially inner faces of the elements in the radially outer rows having a C-shaped profile opening in a radially inward direction, and the radially outer faces of the elements in the radially inner rows having a C-shaped profile opening in the radially outer direction; and the tops of the C-shaped profiles of the elements of each radially inner and radially outer row hooking onto the bottoms of the C-shaped profiles of the elements of the adjacent higher respective radially outer or radially inner row, whereby the rows are self-suspended one from another by the cooperation of their C-shaped profiles.

Fireproof ceramic materials can withstand the high temperatures without difficulty, and thus by producing the pipe of fireproof ceramic material, the resulting pipe can be used for the cleaning of very hot gases. The fact that the pipe is self-supporting means that it can be used in many places, the reason being that the use of foundations and the like is not necessary. Moreover, what is involved is not a lining but an independent pipe.

As the pipe comprises a large number of elements, the result achieved is that it is not only simple to produce and transport, but also to erect. To produce a pipe of the dimensions mentioned earlier of ceramic material and in one piece is extremely difficult. By constructing the centre-pipe of individual elements of a suitable size, there is thus achieved a considerable reduction in the cost of a ceramic, fireproof pipe.

Preferably, the elements of each radially inner and radially outer row are circumferentially offset relative to the elements in the respective adjacent radially outer and radially inner rows.

Advantageously, the tops and bottoms of the C-shaped profiles are defined by arcuately undercut horizontal projections at the tops and bottoms of the elements, and the part of each projection which hooks onto a complementary part of a projection of another element has, at each end, a raised edge portion extending substantially one quarter of the length of the element.

Preferably, the C-shaped profiles of each radially inner and radially outer row of elements are substantially filled by the projections from the elements of the two respective adjacent radially outer and radially inner rows.

When assembling the pipe, a layer of mortar can be used between the individual elements. Achieved hereby is a strong centre-pipe which also has very even and smooth surfaces. The mortar also ensures that the elements are held securely in engagement with one another.

BRIEF DESCRIPTION OF THE DRAWINGS

The invention will now be described in further detail with reference to the accompanying drawing, where.

DESCRIPTION OF THE PREFERRED EMBODIMENT

Figure 1:
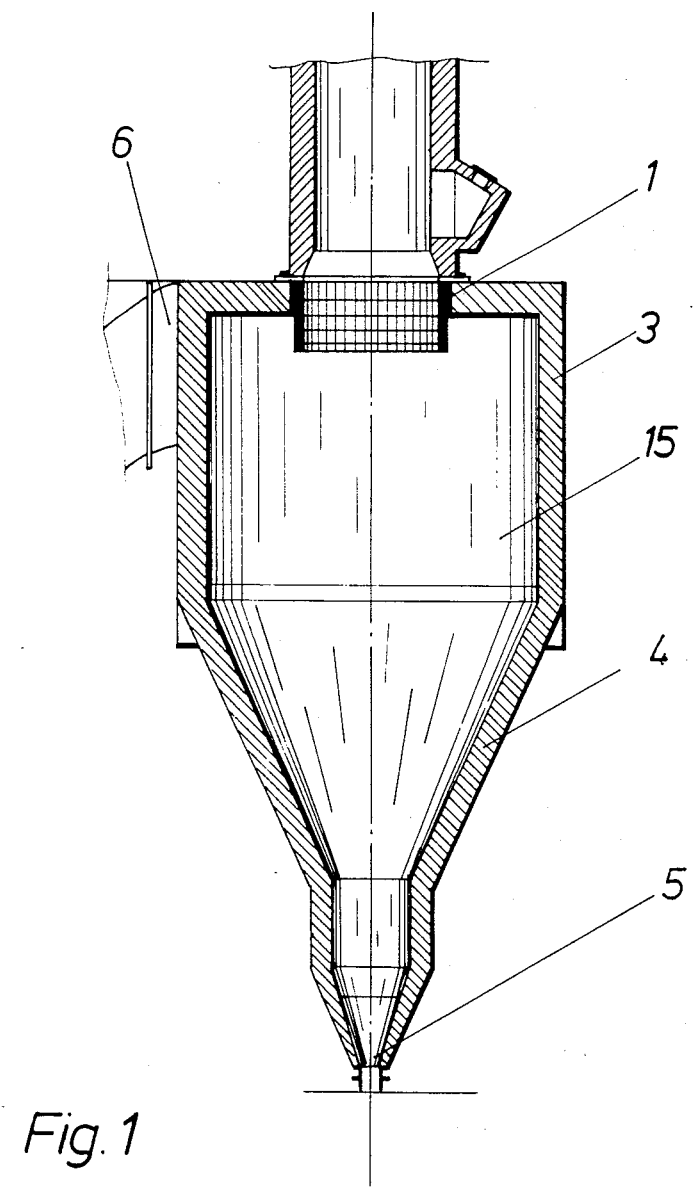
FIG. 1 shows a vertical section through a cyclone which uses a pipe according to the invention as the centre-pipe.

In FIG. 1 is shown a cyclone having a cylindrical part 3 and a conical part 4, where it is expedient for both of these parts to be made of metal. The air or gas to be cleaned is introduced radially through an injection opening 6, and thus a primary and a secondary vortex will arise in the cyclone chamber 15. Particles in the gas will accumulate at the outlet 5 which can be provided with a sluice, and from where they can be removed in a known manner. The cleaned gas will leave the cyclone through the centre-pipe 1, which according to the invention is made of a ceramic and fireproof material which is capable of withstanding the very high temperatures which arise in the production of, for example, burned lime or cement.

Figure 2:
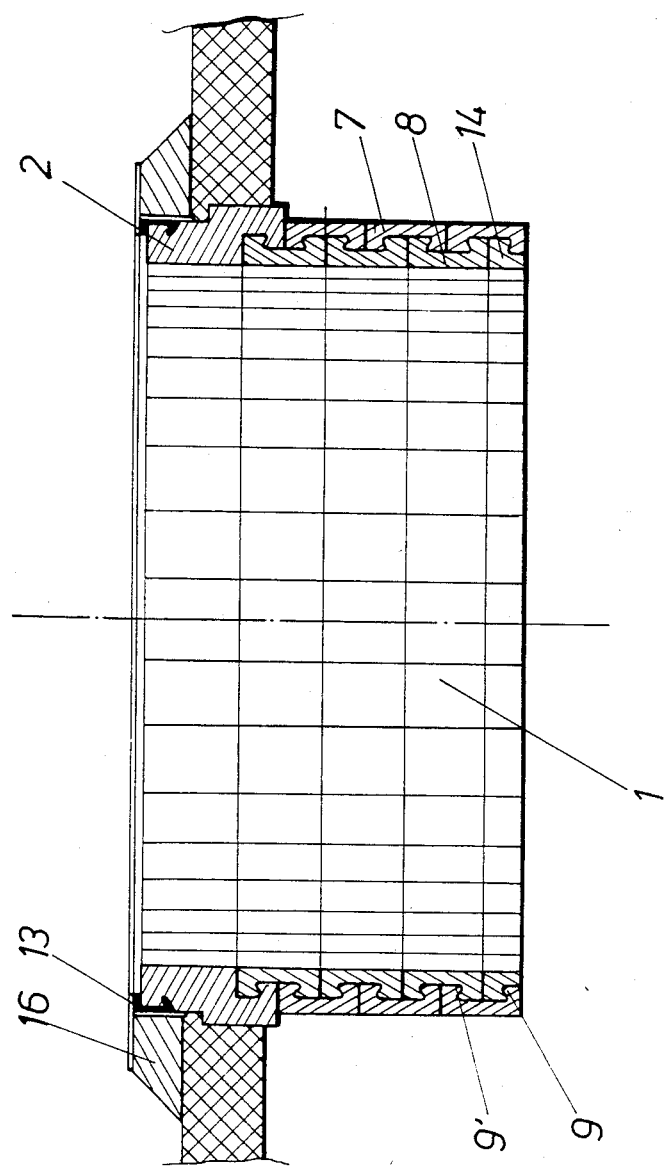
FIG. 2 shows the centre-pipe from the cyclone in FIG. 1, seen on a larger scale.

The centre-pipe is shown in more detail in FIG. 2. The centre-pipe 1 consists of upper end elements 2, outer elements 7, inner elements 8 and lower end elements 14. All of these elements are hooked together in an assembly capable of sustaining axial tension. The fireproof elements have, in fact, such a great mechanical strength that it is possible to suspend the whole of the centre-pipe from the upper end elements 2. These are provided with grooves in which the anchoring devices 13 can be engaged. The anchoring devices 13 are mounted on a steel construction 16 which supports the whole cyclone, but it is equally possible to secure the end elements 2 to the cyclone itself.

The outer elements 7 and the inner elements 8 are arcuate in shape, thus when placed together, they form a cylindrical pipe. Both the inner as well as the outer elements 7, 8 have a C-shaped cross-section with two horizontal projections 9, 9'. These projections 9, 9' are of a height which is ¼ of the height of the elements. The elements are assembled to form a centre-pipe 1, in that the individual elements are hooked together and in that the upper end elements 2 carry all the remaining elements. The individual elements are of a size which makes both their manufacture and transport expedient. It will be obvious that the elements are capable of being transported separately, and then assembled to form the centre-pipe in the construction of the cyclone itself. This assembly is made very simple by virtue of the projections 9, 9', in that subsequent elements are merely hooked onto those already suspended.

Since the height of the projections 9, 9' is ¼ of the height of the elements, the elements 7, 8 can be hooked together in bonded connection to form a surface with a minimum of joint space. It can be expedient for the elements in one row to be displaced circumferentially in relation to the elements in vertically adjacent rows. Each element will thus be suspended from two elements hanging above it, and will itself support two elements hanging below it, the result being that each element will be in connection with four surrounding elements. The construction thus achieved is very solid, even though the centre-pipe is built up of elements. Should some of the individual elements break or lose their supporting ability, the centre-pipe will nevertheless remain hanging together.

In order to produce a smooth edge at the centre-pipe's lower edge, lower end elements 14 are mounted. It is important that the lower edge of the centre-pipe 1 has an even surface, the reason being that it is desirable to have as much control as possible over the flow in the cyclone. The shape of the lower end elements 14 is the same as that of the upper half of the inner elements 8, but many other shapes are possible.

In order to produce smooth surfaces on the centre-pipe 1, so that the course of flow is as uniform as possible, the space between the individual elements can be filled with mortar, said mortar being of a suitably alkali-resistant type. This will naturally also increase the strength of the centre-pipe 1. Similarly, it is envisioned that the mortar used will be of a kind which is capable of withstanding the high temperatures which will arise.

Figure 5:
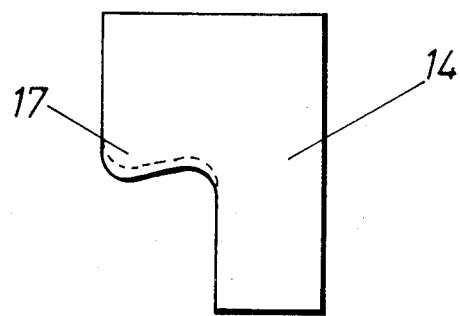
FIG. 5 shows a vertical section through a lower end element.
Figure 6:
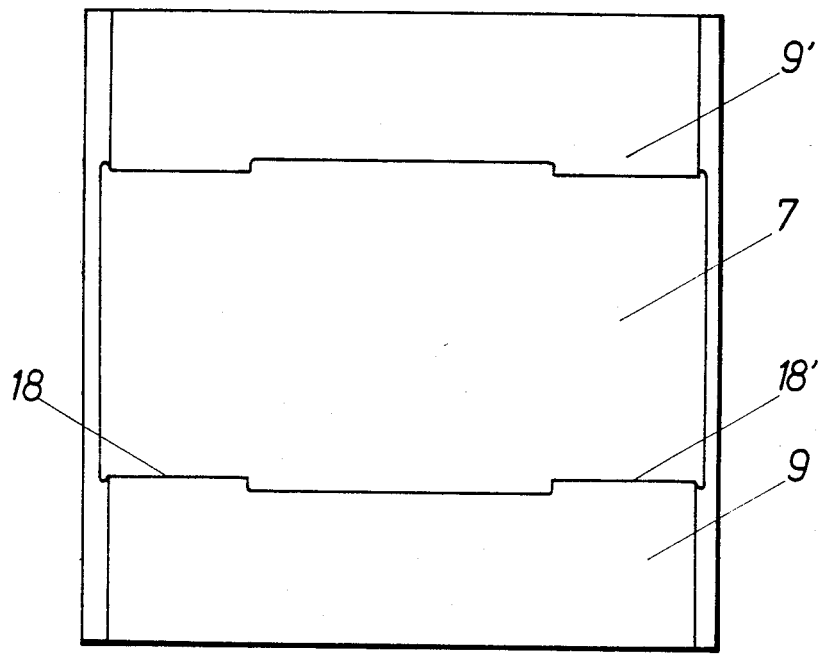
FIG. 6 shows an outer element according to the invention, seen from the inner side.

As can be seen particularly in FIGS. 3, 4, 5 and 6, the projections are provided with an inclined surface 10, 10'. The effect of this surface is that the elements are held securely together, the reason being that the elements lock together when being assembled. As shown in FIG. 6, the projections 9, 9' are also provided with a raised edge portion 18, 18', the length of which is ¼ of the total length of the element 7. By means of these raised edge portions 18, 18', a similar locking effect is achieved in the elements' longitudinal direction. When the centre-pipe 1 is correctly assembled, it will therefore be very strong.

Figure 3:
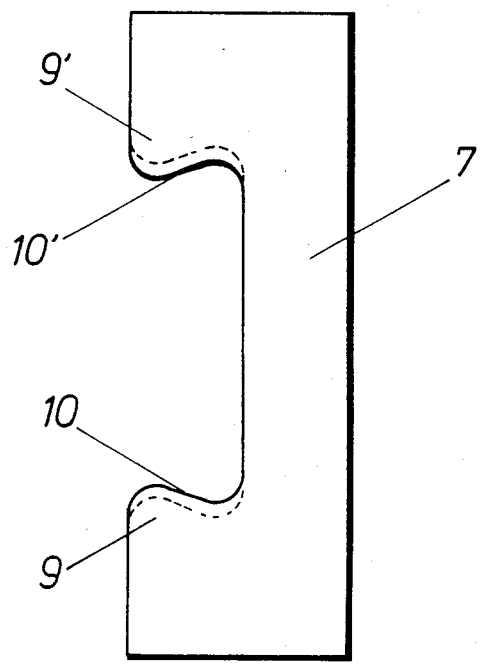
FIG. 3 shows a vertical section through an outer element according to the invention.
Figure 4:
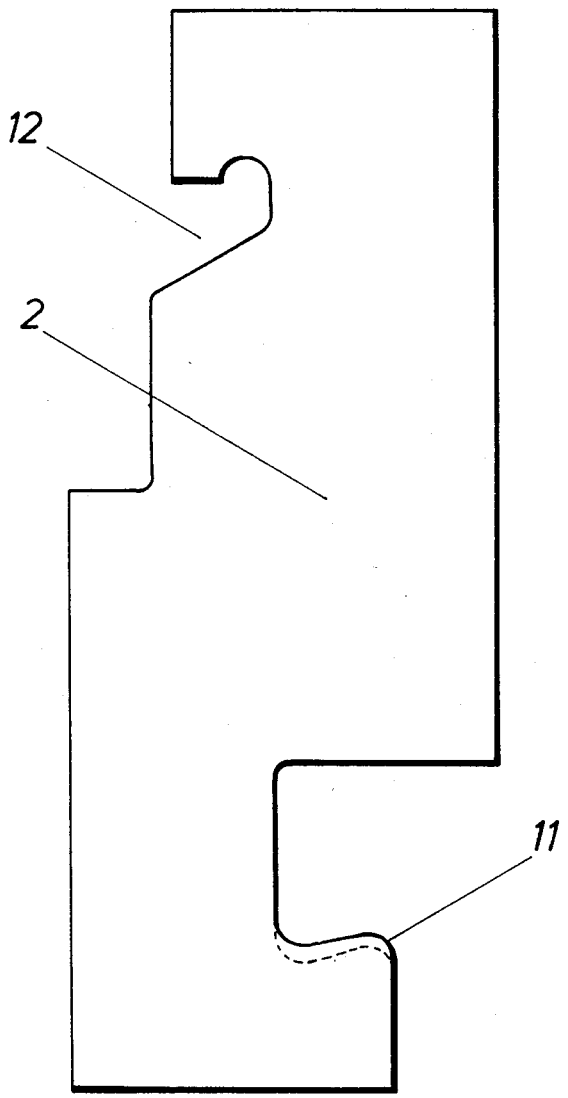
FIG. 4 shows a vertical section through an end element according to the invention.

Except for its curvature, the outer element 7 shown in FIG. 3 is identical to the inner elements 8. The upper end element 2, which is seen in FIG. 4, is provided with a groove 12 which engages with an anchoring device. The elements 2 are also provided with a projection 11 which, in shape and size, corresponds to the projections on the remaining elements.

The lower end element 14 shown in FIG. 5 has a projection 17 which similarly corresponds to the projections on the remaining elements. The shape of this element is the same as that of a half-part of one of the remaining elements.

In FIG. 6 is seen an outer element 7 seen from the inner side. Although the above-mentioned raised edge portions 18, 18' are shown only in connection with an outer element 7, it is obvious that such raised edge portions are to be found on all projections. An attempt to illustrate this has been made by means of the dashed lines in FIGS. 3, 4 and 5.

Figure 7:
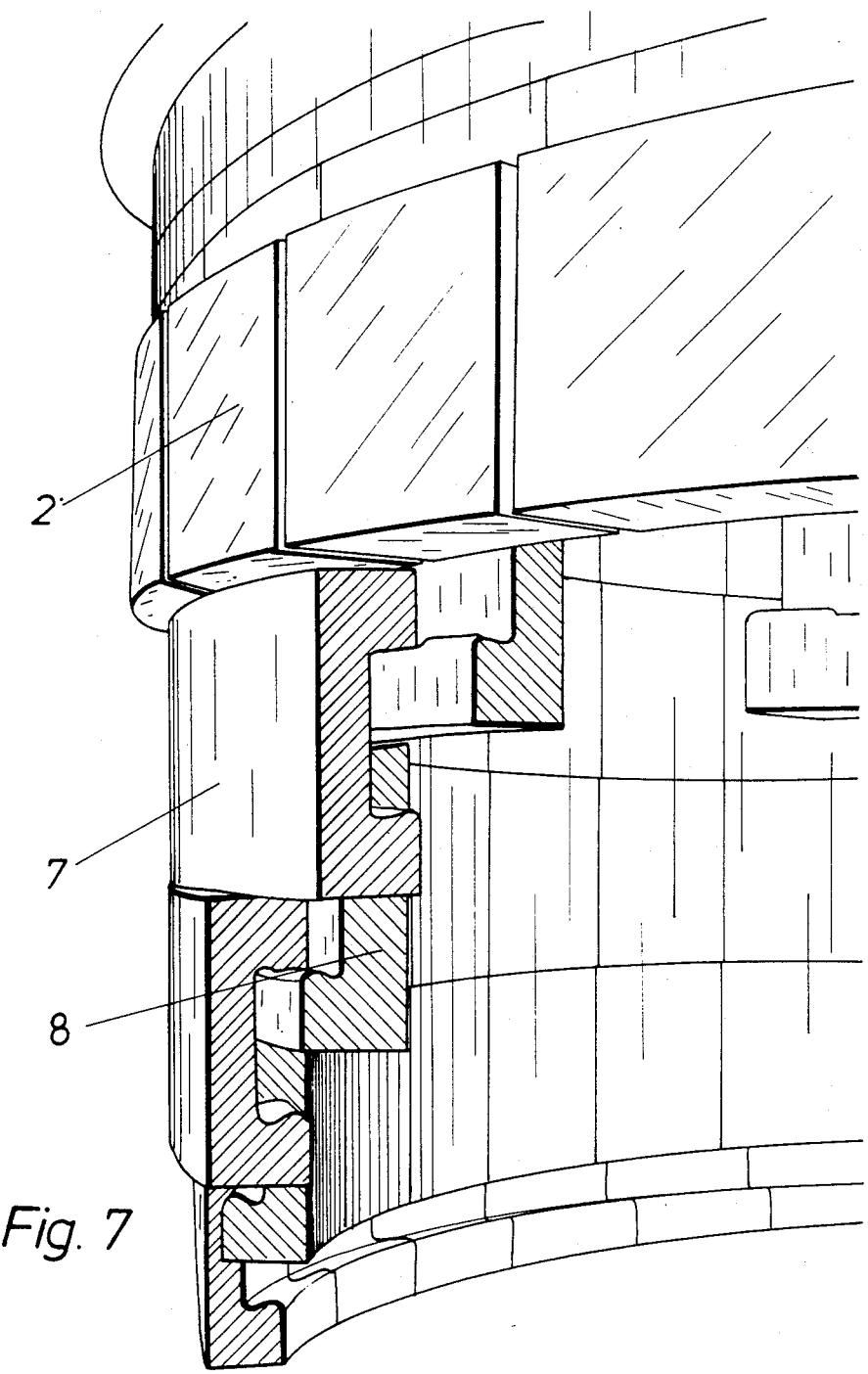
FIG. 7 shows a pipe according to the invention under construction.

In FIG. 7 is shown a pipe according to the invention under construction. The individual elements are disposed in bonded connection in both the vertical and the horizontal plane.

As it will also appear from FIGS. 1 and 2, it will be seen in FIG. 7 that the end elements 2 are considerably stronger than the remaining elements. The reason is that the upper end elements 2 must be able to bear the whole of the centre-pipe 1. In the drawing is shown only that part of the centre-pipe 1 which extends into the cyclone chamber 15. Of course, it will be clear that in practical application, the centre-pipe 1 must be led either to a discharge opening or to a further cyclone. If required, there is nothing to prevent the centre-pipe also outside the cyclone from being made of fireproof material.

The individual elements are capable of being provided with many different forms. The embodiment shown in the drawing is merely an example which, in many cases, it will be expedient to follow. In the event of special cyclone constructions being necessary to achieve a sufficiently good cleaning of the gas, the centre-pipe according to the invention can, of course, be formed in the most expedient manner.

It is similarly obvious that the centre-pipe according to the invention can be used in all places where it is desired to remove particles from hot gases, and not only with rotary ovens for the manufacture of cement.

The centre-pipe can, for example, be made of the moulding material D 52 A, which is manufactured by Hasle Klinker-og Chamottestensfabrik A/S, but it is naturally also possible to use any other material which can be moulded and is capable of withstanding the thermal loads.

Finally, it must be emphasized that the pipe according to the invention can also be used in many other places. We have already mentioned fluid-bed installations. However, the pipe can be used in all places where, for one reason or another, there is use for a pipe which can tolerate the very high temperatures. The essential factor is merely that the pipe is suspendable and made of ceramic material. According to the invention, such a pipe can, in fact, be produced in practically all dimensions.

I claim:

1. A substantially vertical pipe for conveying hot gases, the pipe being suspended from its upper end and being assembled from superposed, circumferentially extending, radially inner rows of ceramic fireproof elements, and from superposed, circumferentially extending, radially outer rows of ceramic fireproof elements; the radially outer rows being vertically offset relative to the radially inner rows; each of the elements in the radially outer rows having a radially inner face with a C-shaped profile opening in a radially inward direction, and each of the elements in the radially inner rows having a radially outer face with a C-shaped profile opening in the radially outer direction; and the tops of the C-shaped profiles of the elements of each radially inner and radially outer row hooking onto the bottoms of the C-shaped profiles of the elements of the respective adjacent higher radially outer and radially inner row, whereby the rows are self-suspended one from another by the cooperation of their C-shaped profiles.

2. A pipe according to claim 1, wherein the elements of each radially inner and radially outer row are circumferentially offset relatively to the elements in the respective adjacent radially outer and radially inner rows.

3. A pipe according to claim 1 or 2, wherein the tops and bottoms of the C-shaped profiles are defined by arcuately undercut horizontal projections at the tops and bottoms of the elements.

4. A pipe according to claim 3, in which the part of each projection which hooks onto a complementary part of a projection of another element has, at each end, a raised edge portion extending substantially one quarter of the length of the element.

5. A pipe according to claim 3, in which the C-shaped profiles of each radially inner and radially outer row of elements are substantially filled by the projections from the elements of the two respective adjacent radially outer and radially inner rows.

6. A pipe according to claim 5, in which mortar is laid between the elements.

* * * * *